June 12, 1934.　　　　G. H. HAINES　　　　1,962,642
MIXING APPARATUS
Filed June 8, 1931　　　　2 Sheets-Sheet 1
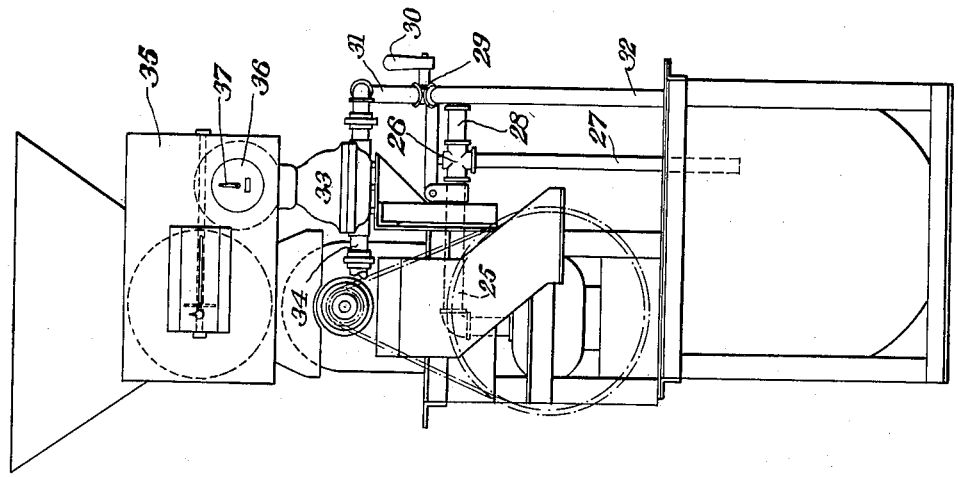
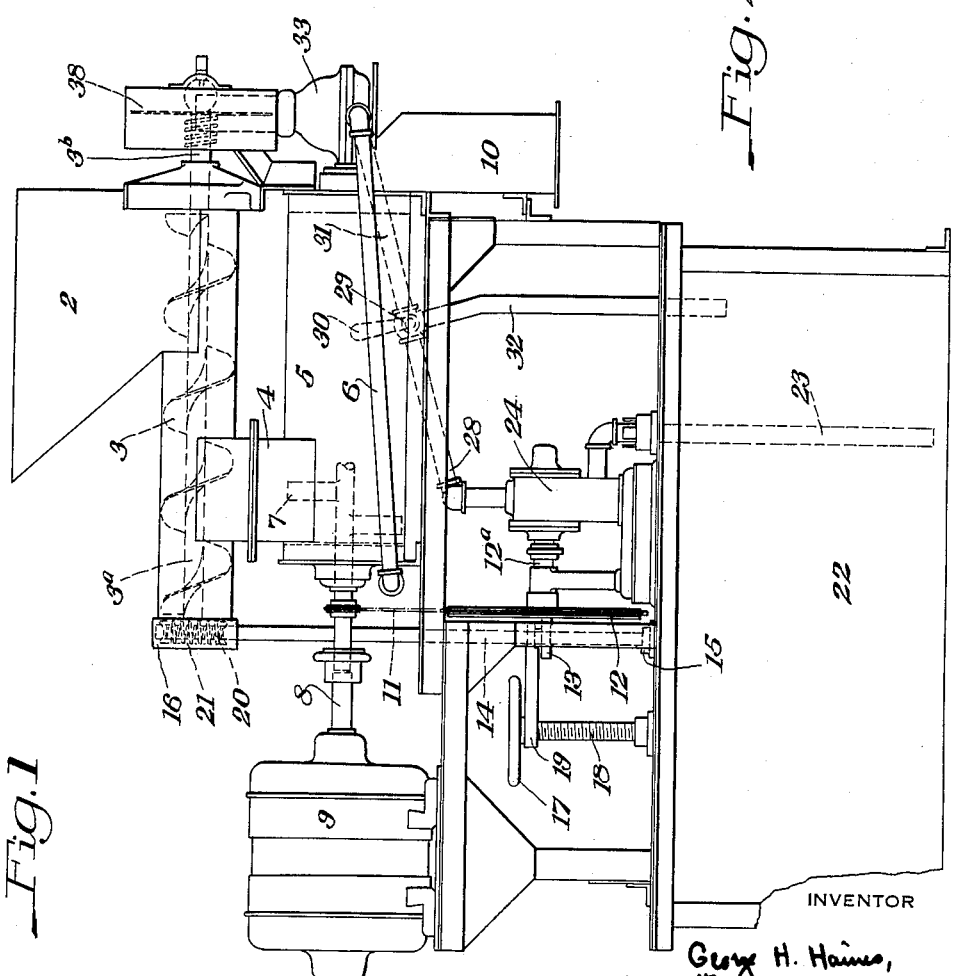
INVENTOR
George H. Haines,
by his atty,
Byrne, Stebbins, Parmelee & Blenko

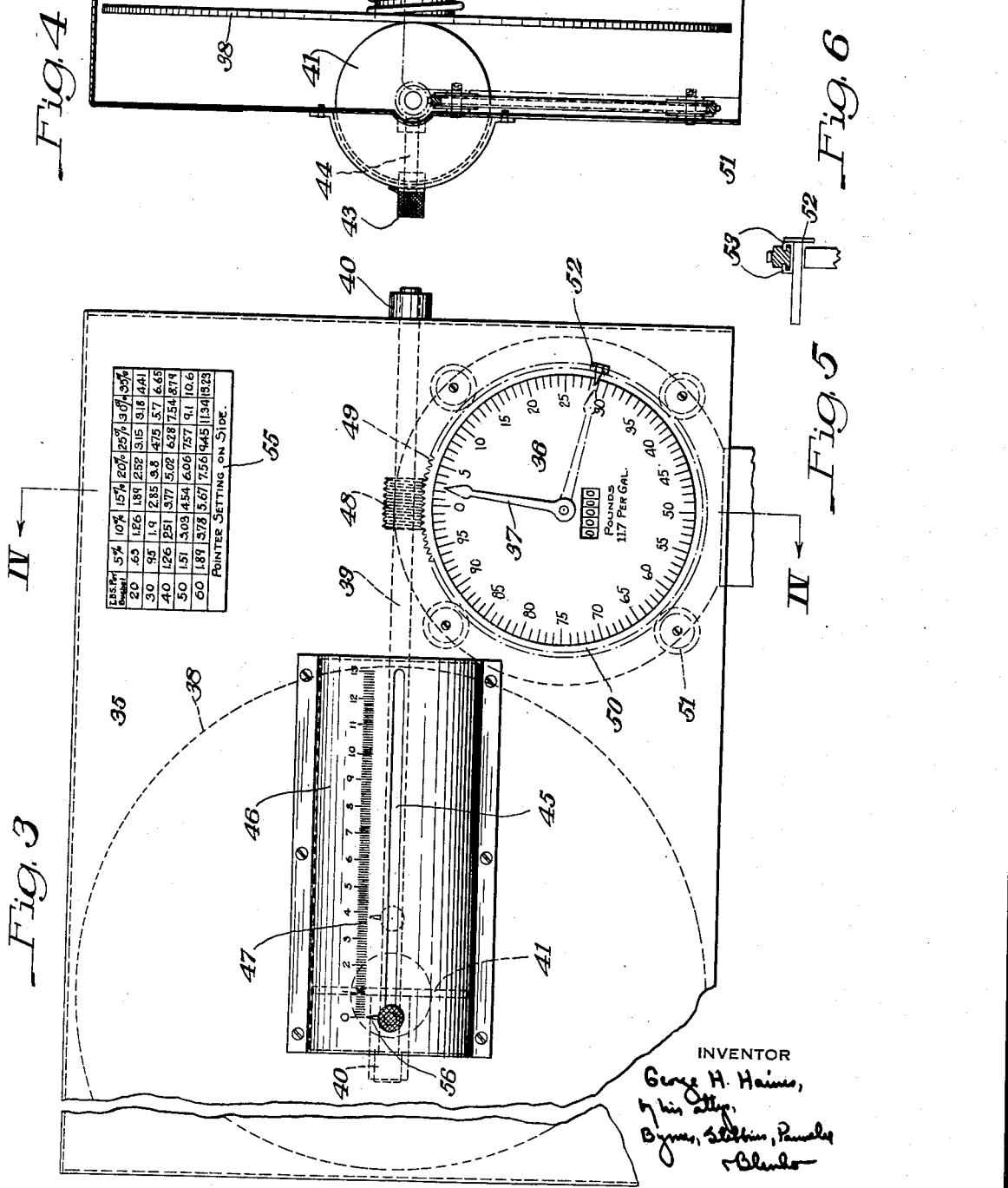

Patented June 12, 1934

1,962,642

UNITED STATES PATENT OFFICE 1,962,642

MIXING APPARATUS

George H. Haines, Caledonia, Ohio, assignor to The Grain Machinery Company, Marion, Ohio, a corporation of Ohio Application June 8, 1931, Serial No. 542,971

3 Claims. (Cl. 259—10)

This invention relates to a method and apparatus for continuously mixing a solid and a liquid and is herein particularly described as applied to a feed mixer wherein stock feed is mixed with molasses.

Various schemes for mixing a solid and a liquid, such as in the case of a feed mixer, have been proposed. Some of them are batch mixers, but batch mixing, generally speaking, is not as desirable, because of difficulties of handling, cleaning of apparatus, etc., as is continuous mixing. In the continuous mixers, however, great difficulty is encountered in maintaining the desired proportion between the solid and the liquid. This is especially true with liquids such as molasses. Their viscosity changes rapidly with temperature, and while it has been proposed to vary the speed of the supply pumps or to regulate a supply valve so as to adjust the quantity of liquid fed, no setting can be predetermined unless it takes into account the temperature. This imposes so many difficulties as to make it practically out of the question to accurately measure the rate of fluid supply in this fashion.

I provide for an actual measurement of the rate at which the materials are supplied to the mixer rather than depend upon the setting of any supply means. Preferably I measure the rates of supply on adjacent indicators. It is thus possible to ascertain by mere visual inspection at the same time whether or not the desired ratio between solid and liquid material is being maintained, and to effect such adjustment as may be necessary. In its preferred form the invention embodies a fluid meter, the indicator of which travels in a predetermined path at a rate corresponding to the actual rate of liquid flow. There is also an indicator moving alongside the path of the liquid indicator and showing the rate at which the solid material is being supplied. Provision is made for varying the distance that one of these indicators travels per unit of material supplied. An adjustment is made in accordance with the desired ratio of solid and liquid materials in the final product such that so long as this ratio is being maintained the indicators travel together. If, for any reason, as, for example, a change in the viscosity of the liquid, the rate of supply of the liquid changes, the indicators become separated, thus immediately showing the operator that it is necessary to effect an adjustment if the desired qualities of the product are to be maintained.

In the accompanying drawings illustrating a present preferred embodiment of the invention, Figure 1 is a side elevation of a feed mixer;
Figure 2 is an end elevation thereof;
Figure 3 is a view to enlarged scale of a portion of Figure 2, partly broken away, showing the indicating mechanism;
Figure 4 is a section on the line IV—IV of Figure 3; and
Figures 5 and 6 are detail views of one of the indicators.

Figures 1 and 2 show the general arrangement of the mixer. Solid material is fed from a hopper 2 by a screw conveyor 3 to a spout 4 leading to a mixing chamber 5. The mixing chamber is supplied with liquid through a pipe 6. These materials are thoroughly intermingled by means of paddles 7 on a shaft 8 driven by a motor 9. The material progresses during the mixing through the mixing chamber 5 and is discharged through a bagging spout 10.

The shaft 8 is connected by means of a sprocket drive 11 to a friction disc 12. A friction wheel 13 is driven from the disc 12. The friction wheel 13 is splined to a shaft 14 mounted in a step bearing 15 at the bottom and in a case 16 at the top. The position of the friction wheel 13 relative to the axis of the disc 12 is adjusted by means of a handwheel 17 on a screw 18. The screw 18 is threaded through an arm 19 which moves up or down as the wheel 17 is turned. The arm 19 is provided with a yoke which holds the wheel 13 in adjusted vertical position. At its upper end the shaft 14 carries a worm 20 meshing with a worm wheel 21 on the shaft 3—a of the screw conveyor 3. The rate at which solid material is supplied to the mixing chamber 5, therefore, depends upon the setting of the friction wheel 13 as determined by the handwheel 17.

The liquid material is supplied from a tank 22 at the bottom of the apparatus. A suction line 23 leads from the tank to a gear pump 24. The pump is driven from the shaft 12a of the friction disc 12 and for any given speed of the motor 9 is driven at a constant speed. The capacity of the pump is sufficient to insure an adequate supply of liquid.

The liquid supplied by the pump 24 travels through a pipe 25 to a safety valve 26 which protects the meter against over pressure. In case excess pressure is developed, the safety valve 26 permits sufficient liquid to flow back to the tank through a pipe 27 to relieve the pressure. The liquid which is to be supplied to the mixing chamber passes through a pipe 28 to a control valve 29. This valve has a hand lever 30. The valve 29 is a three-way valve effective for transmitting any desired part of the liquid from the pipe 28 to a pipe 31, the remaining liquid being returned to the tank through a pipe 32. The liquid entering the pipe 31 travels through a meter 33 and thence to a pipe 34 which makes connection with the pipe 6.

The upper portion of the meter is housed in a casing 35, the meter dial 36 and the pointer 37 being exposed. The casing 35 also houses a projecting end 3b of the shaft 3a, and a disc 38 is secured to such shaft. This disc is used to drive an indicator which cooperates with the pointer 37 of the meter 33.

This apparatus is illustrated in detail in Figures 3 to 6 inclusive. It comprises a shaft 39 mounted in bearings 40 in the case 35, the shaft having a friction wheel 41 splined thereon. The friction wheel 41 bears against the disc 38 and the disc is backed by a spring 42 which insures proper pressure between the disc and the friction wheel. The position of the friction wheel 41 along its shaft 39 will, of course, determine the number of revolutions to be made by the shaft 39 for each revolution of the screw conveyor 3. A thumb nut 43 is provided for adjustably positioning the friction wheel. This thumb nut is screwed on a pin 44 extending through a slot 45 in a semi-cylindrical shell 46 on the face of the casing 35. The pin 44 has a yoke engaging the hub of the friction wheel 41 according to usual construction, whereby the position of the wheel longitudinally of its shaft is determined by the setting of the pin, while leaving the wheel free to rotate. The pin 44 may be fastened in any adjusted position by tightening the thumb nut 43. A scale 47 is provided on the face of the shell 46. The shaft 39 carries a worm 48 meshing with teeth 49 on the rim of a ring 50. The ring is rotatably supported by rollers 51 and extends around the dial 36 of the meter 33. As the shaft of the screw conveyor 3 is rotated, the ring 50 will be correspondingly rotated through the friction drive just described. This ring carries a pointer 52 extending over the dial 36 of the meter. The pointer has spring clips 53 lying in grooves 54 on the sides of the ring 50 so that the pointer may be slipped around to any position desired on the ring, in which desired position it will remain because of friction.

A chart 55 is provided on the face of the casing 35, which chart shows the setting of the pointer 56 carried on the pin 44 for any desired feeding rate. Suppose, for example, that it is desired to obtain a finished feed made from a dry feed weighing 30 pounds per bushel and containing 15 percent molasses. Reading from the scale, the pointer 56 would be set at 2.85, or if a 20 percent mix were desired, it would be set at 3.8. This latter setting is shown in dotted lines. For any setting of the pointer 56 the corresponding ratio between amount of dry feed and amount of molasses is maintained simply by watching the pointers 37 and 52. When the run is commenced the pointer 52 will be slipped around on the ring until it is in alinement with the pointer 37. It then only remains necessary for the operator to adjust the control valve 29 as occasion requires in order to maintain the pointers in alinement. These will both travel around the scale, and as long as they are traveling at the same rate the supply of solid and liquid materials in the mixing chamber will be at a constant ratio. The rate of supply of the liquid is therefore controlled independently of any considerations of viscosity and the like which ordinarily militate against the accuracy of the supply rate. The accuracy is maintained at all times, the rate of supply of both the solid and the liquid being truly volumetric.

I have illustrated and described a present preferred embodiment of the invention. It will be understood, however, that this is by way of example only and that the invention may be otherwise embodied or practiced within the scope of the following claims.

I claim:

1. Apparatus for mixing solids and liquids, comprising a mixing chamber, means for supplying solids thereto, means for supplying liquids thereto, an indicating scale, an indicator traversing said scale, means for causing the indicator to move over said scale in accordance with the amount of liquid supplied by said liquid supply means, a second indicator movable over said scale, and means for actuating the second indicator in accordance with the operation of the solid supply means.

2. In combination with the apparatus defined by claim 1, means for controlling the amount of liquid delivered by said liquid supply means whereby to cause said second indicator to have a predetermined movement relative to the first indicator.

3. Apparatus for mixing solids and liquids, comprising a mixing chamber, means for supplying solids thereto, means for supplying liquids thereto, an indicator having a predetermined path of movement, means operated by the liquid supply means for actuating the indicator in proportion to the liquid supply, a second indicator having substantially the same movement, and means for actuating the second indicator in accordance with the operation of the solid supply means, the actuating means for one of said indicators including a variable speed drive.

GEORGE H. HAINES.